(12) United States Patent
Stumpe

(10) Patent No.: US 6,644,758 B1
(45) Date of Patent: Nov. 11, 2003

(54) AUTOMOTIVE BRAKING SYSTEM ACTUATED BY A PRESSURE FLUID

(75) Inventor: Werner Stumpe, Stuttgart (DE)

(73) Assignee: Knorr-Bremse Systeme für Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 09/959,976

(22) PCT Filed: May 19, 2000

(86) PCT No.: PCT/EP00/04556

§ 371 (c)(1),
(2), (4) Date: Nov. 14, 2001

(87) PCT Pub. No.: WO01/00470

PCT Pub. Date: Jan. 4, 2000

(30) Foreign Application Priority Data

May 21, 1999 (DE) .......................................... 199 23 455

(51) Int. Cl.⁷ .............................................. B60T 13/00
(52) U.S. Cl. ...................................................... 303/9.66
(58) Field of Search ............................. 303/3, 9, 9.63, 303/9.66, 42

(56) References Cited

U.S. PATENT DOCUMENTS 4,616,881 A * 10/1986 Muller et al. ................... 303/7
5,986,544 A * 11/1999 Kaisers et al. ............... 340/431

FOREIGN PATENT DOCUMENTS

| DE | 481227 A1 | * | 4/1992 |
| DE | 0738640 B1 | | 2/1996 |
| DE | 0911237 A2 | | 8/1998 |
| JP | 404031136 A | * | 2/1992 |

* cited by examiner

Primary Examiner—Jack Lavinder
Assistant Examiner—Xuan Lan Nguyen
(74) Attorney, Agent, or Firm—Barnes & Thornburg

(57) ABSTRACT

The invention relates to an automotive braking system which is actuated by a pressure fluid, comprising at least one first brake circuit and a second brake circuit, whereby a first brake cylinder and a second brake cylinder are associated with the second brake circuit and can be connected to a second pressure liquid source for the second brake circuit via a second control valve device according to a control signal provided by a multicircuit braking transmitter. A reversing valve arrangement is arranged between the second control valve device and the first brake cylinder, whereby a valve actuating member can be pressure controlled by the control signal associated with the first brake circuit in such that the first brake cylinder can be connected to a pressure fluid source which is independent with respect to the pressure fluid source of the second brake circuit. A switching device is shifted into a blocking state when anti-slip braking occurs. Thus, the control signal associated with the first braking circuit cannot be connected to the reversing valve arrangement during the blocking state.

10 Claims, 2 Drawing Sheets

AUTOMOTIVE BRAKING SYSTEM ACTUATED BY A PRESSURE FLUID

BACKGROUND AND SUMMARY OF THE INVENTION

State of the Art

The invention is directed to a pressure-medium-actuated vehicle braking system having two brake circuits.

Such a vehicle braking system is shown in German Patent Document DE 195 04 393 C1. The known braking system is intended for a commercial vehicle and has a pneumatically and/or electrically operable rear-axle brake circuit for the two wheels of the rear axle and a pneumatically and/or electrically operable front-axle brake circuit for the two wheels of the front axle. In the event of a breakdown of one brake circuits, the other brake circuit should still sufficiently decelerate the commercial vehicle.

Two brake cylinders constructed as spring brake cylinders (combination brake cylinders) are assigned to the rear-axle brake circuit. The brake cylinders can be connected with a compressed-air reservoir for the rear-axle brake circuit by a first control valve device as a function of a control signal of a multiple-circuit braking value generator assigned to the rear-axle brake circuit. The front-axle brake circuit has a first brake cylinder for the right front wheel and a second brake cylinder for the left front wheel. These brake cylinders can be connected with a compressed-air reservoir for the front-axle brake circuit by a second control valve device as a function of a control signal of the multiple-circuit braking value generator assigned to the front-axle brake circuit. The second control valve device has a first pressure input connected with the compressed-air reservoir for the front-axle brake circuit and a second pressure input connected with a control output of a service brake valve, through which second pressure input a front-axle control pressure is admitted which is derived from the service brake valve. Furthermore, the second control valve device has a pressure output connected with the first brake cylinder and the second brake cylinder of the front axle brake circuits.

As a result of the dynamic axle load displacement during a braking operation, the major portion of the braking force has to be applied by the front wheels. This is true particularly in the case of commercial vehicles with a high front-axle load and an at least temporarily low rear-axle load, as, for example, in the case of semitrailer tractors. This results from a high dynamic axle load displacement which occurs when braking because of their short wheel base and their large center of gravity height. In the event of a failure of the front-axle brake circuit, it is therefore no longer ensured that the braking force, which is now supplied solely by the rear wheels, will be sufficient for achieving the deceleration specified by the legislator. Such a failure of the front-axle brake circuit is caused, for example, by the rupture of a compressed-air pipe or by leakiness in the front-axle brake circuit; so that in time, the pressure in the compressed-air reservoir of the front-axle brake circuit will fall.

In order to solve this problem, a reversing valve arrangement in the form of a relay valve is provided in known vehicle braking system between the pressure output of the second control valve device and the brake cylinder for the left front wheel. The relay piston of this relay valve can be pressure-controlled by a rear-axle control pressure derived from a multiple-circuit braking value generator such that the brake cylinder of the left front wheel can be connected with a compressed-air reservoir which is independent of the compressed-air reservoir of the front-axle brake circuit. The known relay valve has a double seat valve constructed as a combined inlet and outlet valve. When the front-axle brake circuit is intact, an effective area of the relay piston is acted upon by the front-axle braking pressure during braking, while the other effective surface is acted upon by the rear-axle control pressure. As a result, forces are generated at the relay piston which are directed against one another. The size of the effective surfaces of the relay piston is selected such that the outlet valve is held open during braking and thus the front-axle brake pressure generated by the second control valve device can be controlled through the opened outlet valve to the brake cylinder of the left front wheel.

In the event of a failure of the front-axle brake circuit, the pressure falls in the compressed-air reservoir assigned to the front-axle brake circuit and the front-axle brake pressure upon the one effective surface of the relay piston also falls. As a result, the relay piston switches the double seat valve into an emergency braking operating position because the relay piston is forced into a position closing the outlet valve and opening the inlet valve by the rear-axle control pressure still present at the other effective surface. The compressed air of the compressed-air reservoir, which is independent of the compressed-air reservoir of the front-axle brake circuit, can now be switched through the opened inlet valve to the brake cylinder of the left front wheel in order to be used there as a replacement for the failed front-axle brake pressure.

If, in addition, a wheel-slip-dependent control of the brake pressure takes place in the case of the known vehicle braking system, for example, for the purpose of the antilock control (ABS) or the wheel slip control (ASR), the brake pressure for each wheel or for each axle is temporarily controlled to zero. As a result, the above-described reversing valve arrangement would be switched into its emergency braking operating position and compressed air of the compressed-air reservoir, which is independent of the compressed-air reservoir of the front-axle brake circuit, would unnecessarily reach the brake cylinder of the left front wheel.

SUMMARY OF THE INVENTION

In contrast, the pressure-medium-actuated vehicle braking system according to the invention has the advantage that, in the event of a slip-controlled braking, a switching device, which is arranged in front of the reversing valve arrangement, switches into the blocking condition, in which no reversing signal can be switched through to the reversing valve arrangement. As a result, the unnecessary connection of compressed air from the additional compressed-air reservoir is eliminated. Because of the through-connection condition of the switching device in the case of a slip-free braking, the emergency braking function of the reversing valve arrangement is completely maintained.

A control device and automatic control device for the switching device contains a control unit by means of which, as a function of the slip control of the wheel assigned to the first brake cylinder, an electric control signal can be generated for controlling the switching device. The switching device may contain an electrically controllable 3/2-way valve which, when not energized, takes up the through-connecting condition and, when energized, takes up the blocking condition. Because of the currentless through-position of the 3/2-way valve, the reversing valve arrangement for triggering the emergency braking operation remains effective also when the control device and automatic control device fails or is switched off.

BRIEF DESCRIPTION OF THE DRAWINGS

Embodiments of the invention are illustrated in the drawings and are explained in detail in the following description.

DESCRIPTION OF THE EMBODIMENTS

Figure 1:
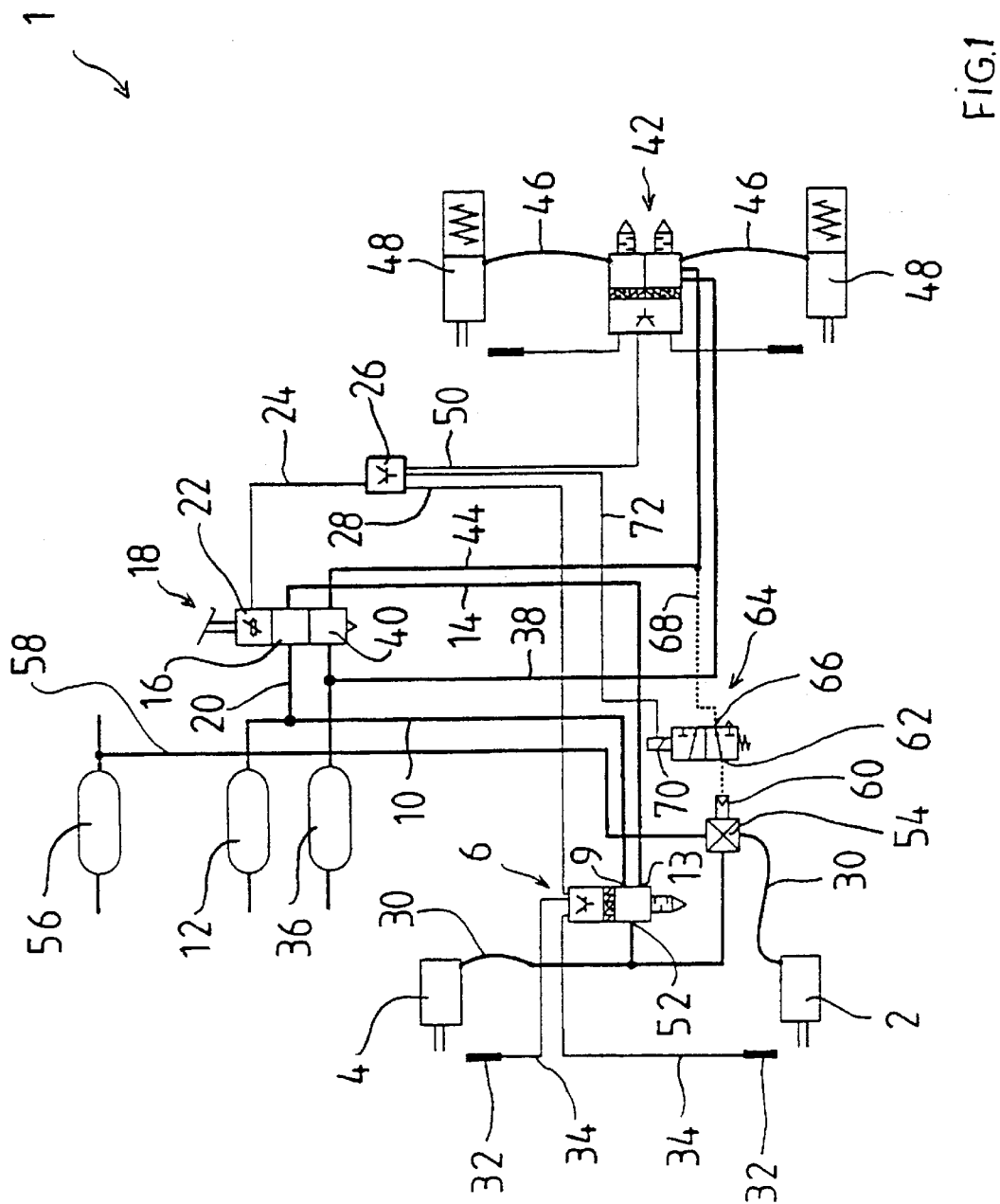
FIG. 1 is a block diagram of a preferred embodiment of the pressure-medium-actuated vehicle braking system according to the invention with a front axle controlled in a single-channel manner.

According to a preferred embodiment, the pressure-medium-actuated vehicle braking system, which as a whole has the reference number 1, is an electronically controlled braking system for commercial vehicles with prior-ranking electro-pneumatic brake circuits and with lower-ranking pneumatic retention circuits as an underlayed safety plane.

In the case of the electronically controlled braking system 1, the front-axle brakes are formed by a brake cylinder 2 of the left front wheel and by a brake cylinder 4 of the right front wheel which are controlled by a single-channel pressure control module 6. The pressure control module 6 of the front axle has a pressure input 9 connected by a storage pressure line 10 with a compressed-air reservoir 12 for the front axle and, on the other hand, a control input 13 of the pressure control module 16 is connected by a control pressure line 14 with the control side of a front-axle channel 16 of a service brake valve 18.

The front-axle channel 16 of the service brake valve 18 is connected on the input side by a branch 20 of the storage pressure line 10 with the compressed air reservoir 12 of the front axle. As a function of the force with which the driver operates the bake pedal, the front axle channel 16 provides proportional control pressure signals to the control pressure line 14 of the front axle.

In addition, when the brake is operated, a proportional electric control signal is generated in an electric part 22 of the service brake valve 18 and is led by way of an electric line 24 to a central electronic control unit 26. By an electric control line 28, the control electronic control unit 26 controls the pressure control module 6 of the front axle. As a function of the electric control signals, a modulated control pressure is generated in a known manner in the pressure control module 6 of the front axle and by way of a common pneumatic brake pressure line 30 is controlled into the brake cylinders 2, 4. The compressed-air reservoir 12 for the front axle, the electric part 22 of the service brake valve 18, the central electronic control unit 26, the electric control line 28, the pressure control module 6, the brake pressure line 30 and the brake cylinders 2, 4 together form an electro-pneumatic front-axle brake circuit.

The circuit logic of the pressure control module 6 treats the electric control signals of the electro-pneumatic front-axle brake circuit with a higher priority than the control pressure signals of a pneumatic front axle brake circuit from the control pressure line 14 at control input 13. The pneumatic front-axle control circuit, as a retention brake circuit, exercises a redundant control function when a disturbance occurs in the electro-pneumatic front-axle brake circuit. The electro-pneumatic front-axle brake circuit partially overlaps with the pneumatic front-axle brake circuit which comprises the compressed-air reservoir 12 for the front axle, the front-axle channel 16 of the service brake valve 18, the control pressure line 14, the pressure control module 6, the brake pressure line 30 and the two brake cylinders 2, 4.

In addition to controlling the brake pressure by integrated ABS (antilock system) functions, the pressure control module 6 of the front axle permits an adaptation of the brake pressure to the rotating behavior of the braked front wheels which is measured by wheel-related rotational speed sensors 32 and is conducted by electric lines 34 to the pressure control module 6. In the case of an ABS control at the front axle according to FIG. 1 which is controlled in a single-channel manner, the pressure control module 6 controls a joint brake pressure by the joint brake pressure control line 30 to the brake cylinder 2 of the left front wheel and to the brake cylinder 4 of the right front wheel. Preferably, according to the so-called "select-low method", the joint brake pressure for both brake cylinders 2, 4 depends on the wheel which is running at the lower coefficient of friction.

An electro-pneumatic rear-axle brake circuit and a pneumatic rear-axle brake circuit which is of a lower priority than the former brake circuit have an analogous construction with the exception of the single-channel brake pressure control. A separate compressed-air reservoir 36 for the rear axle is connected by a storage pressure line 38 with the input of a rear-axle channel 40 of the service brake valve 18 and connected with a two-channel pressure control module 42 of the rear axle. One channel respectively is provided for controlling the brake pressure of an individual rear wheel.

On the output side, the service brake valve 18 controls control pressure signals into the pressure control module 42 of the rear axle by a control pressure line 44. Pressure control module 42 is connected by pneumatic braking pressure lines 46 with combination brake cylinders 48 of the right and the left rear wheel. Electric signals generated by the service brake valve 18 are connected by the electric line 24 to the central electronic control unit 26 which provides control signals by an electric control line 50 to the pressure control module 42 of the rear axle.

As a function of the electric control signals supplied by the central electronic control unit 26 by way of the electric control lines 28, 50 or in the event of a failure of the electro-pneumatic control circuits as a function of the control pressures supplied by way of the pneumatic control pressure lines 14, 44, the braking pressures are generated for each axle in the pressure control modules 6, 42 of the front axle and the rear axle from the storage pressures supplied by the storage pressure lines 10, 38. The braking pressures are in each case present at a pressure output 52 of a pressure control module 6 and output of module 42 and are connected by the pneumatic brake pressure line 30, 46 to the brake cylinders 2, 4 or combination brake cylinders 48 connected on the output side of the modules.

A reversing valve arrangement 54 known, for example, from German Patent Document DE 195 04 393 C1 is connected between the pressure output 52 of the pressure control module 6 of the front axle and the brake cylinder 2 of the left front wheel. The function of this reversing valve arrangement 54 is similar to that of a relay valve. This reversing valve arrangement 54, in the event of a pressure loss in the front-axle brake circuit, supplies compressed air from a back-up compressed-air reservoir 56 for generating the braking pressure in the brake cylinder 2 of the left front wheel by a storage pressure line 58.

A control input 60 of the reversing valve arrangement 54 is connected with an output 62 of a prior-ranking or superimposed switching device 64 shown as a 3/2-way valve 64. An input 66 of the valve 64 is connected by a pneumatic connection line 68 with the control pressure line 44 of the rear axle. An electric control connection 70 of the 3/2-way valve 64 is connected by an electric control line 72 with the central electronic control unit 26 in a controllable manner. In a currentless or de-energized state, the 3/2-way valve 64 takes up the through-condition illustrated in FIG. 1 in which its input 66 is connected through to the output 62 and a control pressure $p_{HA}$ for the pressure control module 42 of the rear axle, which control pressure is carried in the control pressure line 44, is present at the control input 60 of the reversing valve arrangement 54. In an energized state, the 3/2-way valve 64 takes up a blocking condition in which its input 66 is blocked and its output 62 is connected with the atmosphere.

The switching device, which according to the embodiment illustrated in FIG. 1 is a 3/2-way valve 64 and which is arranged in front of the reversing valve arrangement 54, operates as follows in the event of a braking initiated by the service brake valve 18:

If no pressure losses exist in the electro-pneumatic and/or in the pneumatic front-axle brake circuit; that is, when the front-axle brake circuits are intact, the service brake valve 18 generates a control pressure PVA in the control pressure line 14 of the pneumatic front-axle circuit, and supplies it to the control input 13 of the pressure control module 6. When the electrical system is intact, this control pressure is retained in the pressure control module 6. In an overriding manner, a pressure is modulated in the pressure control module 6 as a function of the control signals supplied by the electric control line 28 from central electronic control unit 26. This pressure controls by way of the pressure output 52 or by way of the reversing valve arrangement 54, which is through-connected in this case, a brake pressure into the brake cylinder 2 of the left front wheel, While not energized, the 3/2-way valve 64 takes up the through-connection condition illustrated in FIG. 1 which is why the control pressure $P_{HA}$ for the pressure control module 42 of the rear axle, which control pressure is carried in the control pressure line 44, is present at the control input 60 of the reversing valve arrangement 54. The reversing valve arrangement 54 is constructed such that, when the electro-pneumatic and pneumatic front-axle brake circuits are intact, the brake pressure for the brake cylinder 2 of the left front wheel is not influenced by the control pressure $p_{HA}$ of the rear axle.

If, during the braking, a required wheel-slip dependent control of the brake pressure now takes place by the pressure control module 6, for example, in the event of a locking of the left front wheel, the brake pressure in the brake cylinder 2 of the left front wheel and, because of the ABS brake pressure control of the front axle carried out in a single-channel manner, simultaneously also in the brake cylinder 4 of the right front wheel is temporarily lowered to zero. Consequently, an undesirable reversing of the reversing valve arrangement 54 would normally occur and, as a result, compressed air from the back-up compressed air reservoir 56 would be used for generating additional brake pressure.

In contrast, according to the invention, during an antilock control (ABS) of the brake pressure by the pressure control module 6, which can be detected, for example, by a comparison of the circumferential wheel speed measured by the rotational speed sensors 32 with the speed of the commercial vehicle in the central electronic control unit 26, an electric control signal is emitted to the electric control connection 70 of the 3/2-way valve 64 which will then switch into its energized blocking condition. As a result, the pressure $p_{HA}$, which is present in the control pressure line 44 of the rear axle and input 66 of the valve 64, is cut off from the control input 60 of the reversing valve arrangement 54 and thus can no longer cause its reversing into the emergency braking operating position. Because the ABS brake pressure control at the front axle takes place in a single-channel manner and the brake pressure for both brake cylinders 2, 4 is therefore controlled jointly, the electronic control signal for reversing the 3/2-way valve 64 is already generated when one of the wheels slips, for example, the left front wheel assigned to the brake cylinder 2.

As soon as the wheel-slip-dependent controlling of the brake pressure has been concluded, the 3/2-way valve 64 will no longer receive a control signal at electric control connection 70 from the central electronic control unit 26, whereupon the 3/2-way valve 64 will switch back into the currentless de-energized through-connection condition.

When a defect occurs in the pneumatic front-axle brake circuit or in the electro-pneumatic front-axle brake circuit during a braking, for example, as a result of a crack or a leakage in the storage pressure line 10, in the compressed-air reservoir 12 or a disturbance of the electric triggering of the pressure control module 6, the brake pressure will fall in both brake cylinders 2, 4. When the brake pressure with respect to the axle is low or non-existing, none of the two wheels of the front axle can lock and therefore no antilock control (ABS) will be activated. Therefore, no electric triggering signal for the 3/2-way valve 64 will be generated and 3/2-way valve 64 will maintain its currentless de-energized through-connection condition and the control pressure $p_{HA}$ of the rear axle can be controlled through to the control input 60 of the reversing valve arrangement 54. Since, because of the low or lacking brake pressure, the state of equilibrium is disturbed at the valve body of the reversing valve arrangement 54, the reversing valve arrangement 54 will switch into its emergency braking operating position, whereupon the brake cylinder 2 of the left front wheel is supplied with a brake pressure modulated from the compressed air of the back-up compressed-air reservoir 56, and the left front wheel can be braked.

When now an antilock control (ABS) takes place during such an emergency braking because too much brake pressure was provided to the left front wheel and a brake slip is therefore occurring there. This is detected by the electronic control unit 26 by the absent pressure signal from the pressure control module 6, and the electronic control unit 26 carries out an emergency ABS control. The 3/2-way valve 64 is switched by the control signal of the central electronic control unit 26 into the blocking condition, whereupon the reversing valve arrangement 54 prevents the supply of compressed air from the back-up compressed-air reservoir 56. The brake pressure in the brake cylinder 2 of the left front wheel will then fall and its brake locking condition is eliminated.

Figure 2:
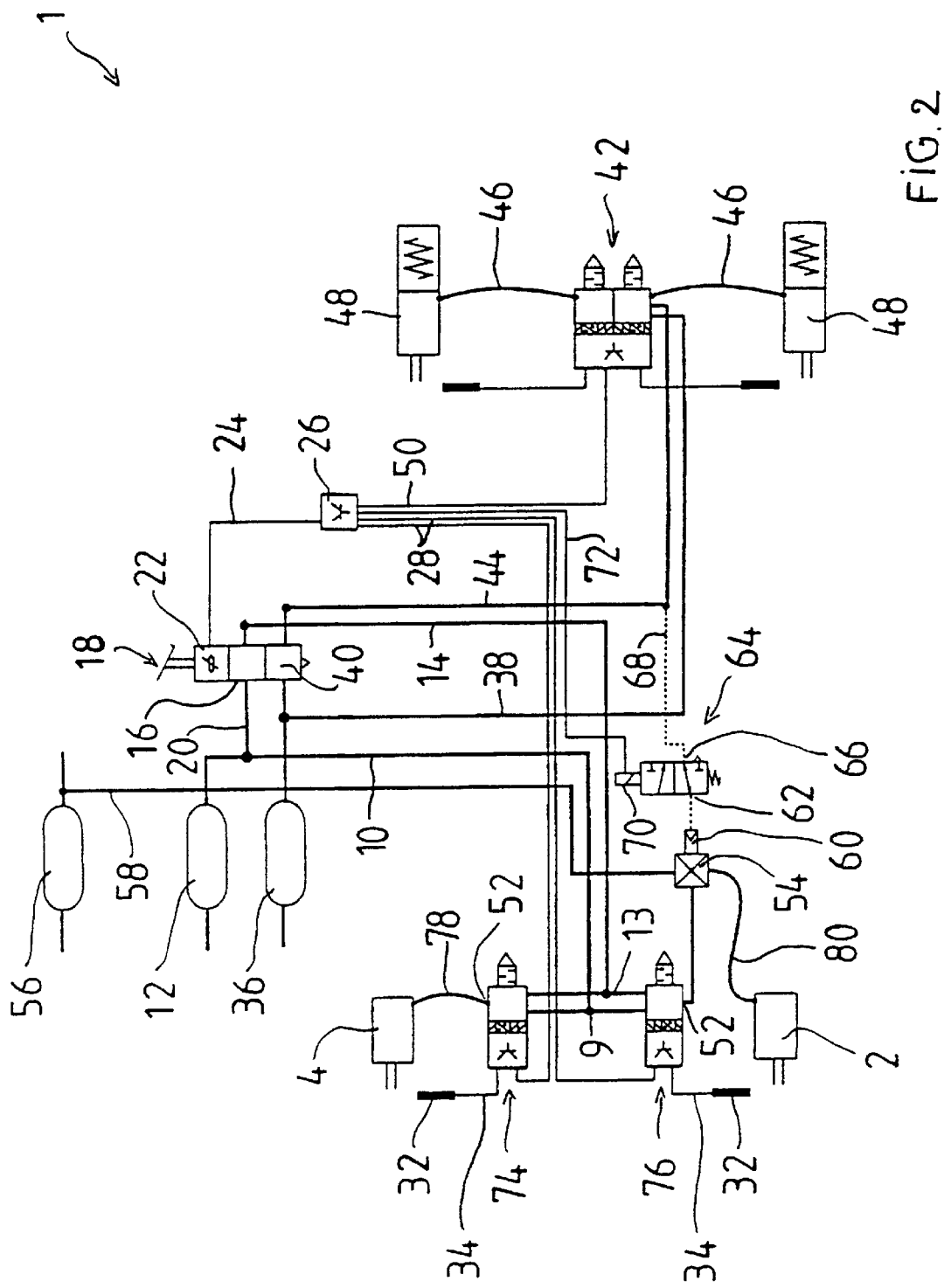
FIG. 2 is a block diagram of another embodiment of the pressure-medium-actuated vehicle braking system with a front axle controlled in a dual-channel manner.

FIG. 2 shows another embodiment in which, in contrast to the first embodiment, the brake pressure for the front axle, instead of being controlled in a single-channel manner, is controlled in a dual-channel manner by two pressure control modules. A right pressure control module 74 is used for the individual controlling of the brake pressure in the brake cylinder 4 of the right front wheel and a left pressure control module 76 is used for the individual controlling of the brake pressure in the brake cylinder 2 of the left front wheel. Mutually independent brake pressure lines 78, 80 connect the pressure control modules 74, 76 with the brake cylinders 2, 4. For a joint compressed-air supply of both pressure control modules 74, 76, the control pressure line 14 and the storage pressure line 10 are branched. In addition, in FIG. 2, components which are identical with those of FIG. 1 have the same reference numbers. Thus, for example, the switching device in the form of the 3/2-way valve 64 is identical with the one illustrated in FIG. 1.

Because the ABS brake pressure control takes place individually for each wheel and an undesirable reversing of the reversing valve arrangement 54 therefore can take place only upon a slip-controlled lowering of the brake pressure in the brake cylinder 2 of the left front wheel, in this embodiment, the electric control signal for switching the 3/2-way valve 64 into the blocking condition is generated only as a function of the slip of the left front wheel. The sequence of operations will then be the same as in the first embodiment according to FIG. 1.

In order to provide a triggering of the 3/2-way valve 64 which is suitable for several variants of slip controls, for the single-channel brake pressure control of both brake cylinders 2, 4 according to the embodiment of FIG. 1 as well as for the individual-wheel brake pressure control according to the embodiment of FIG. 2, the 3/2-way valve can be switched in the desired manner in that the electric switching control signal is generated as a function of the occurrence of a slip control at the left front wheel and the pressure which is controllable at the pressure control module output 52.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A vehicle braking system which can be actuated by a pressure medium and which has at least a first brake circuit and a second brake circuit, comprising:
    a) the first brake circuit including at least one brake cylinder connected by a first control valve device, as a function of a control signal of a multiple-circuit brake value generator at the first brake circuit, with a pressure medium source of the first brake circuit,
    b) the second brake circuit including a first brake cylinder and a second brake cylinder connected by a second control valve device, as a function of a control signal of a multiple-circuit brake value generator of the second brake circuit, with a second pressure medium source of the second brake circuit,
    c) the second control valve device having a pressure medium input connected with the pressure medium source of the second brake circuit and a pressure medium output connected with the first brake cylinder,
    d) a reversing valve arrangement between the pressure-medium output of the second control valve device and the first brake cylinder of the second brake circuit, the reversing valve arrangement including a valve actuating element which is pressure-controlled by the control signal of the first brake circuit to connect the first brake cylinder with a pressure medium source which is independent of the pressure medium source of the second brake circuit,
    e) an electronic control and automatic control device for a wheel-slip-dependent controlling of at least the brake pressure in the first brake cylinder; and
    f) a switching device, responsive to wheel-slip dependent controlling by the electronic control and automatic control device, to normally connect the control signal for the first brake circuit to the reversing valve arrangement in a through-connection condition and to block the control signal for the first brake circuit from the reversing valve arrangement in a blocking condition for a slip-controlled braking of the wheel.

2. A vehicle braking system according to claim 1, wherein, the electronic control and automatic control device contains a control unit which, as a function of a slip control of the wheel of the first brake cylinder, generates an electric control signal for triggering the switching device.

3. A vehicle braking system according to claim 2, wherein the switching device contains an electrically controllable 3/2-way valve which, when not energized, takes up the through-connection condition and, when energized, takes up the blocking condition.

4. A vehicle braking system according to claim 3, wherein
    a) the control signal assigned to the first brake circuit contains a first pneumatic control pressure connected by a first control pressure line to the first control valve device, and a first electric control signal which is generated by the electronic control and automatic control device and which is connected by a first electric control line to the first control valve device,
    b) the control signal assigned to the second brake circuit contains a second pneumatic control pressure connected by a second control pressure line to the second control valve device, and a second electric control signal which is generated by the electronic control and automatic control device and which is connected by a second electric control line to the second control valve device, and
    c) the first and the second control valve devices are triggered in an overriding manner by the first and the second electric control signals.

5. A vehicle braking system according to claim 4, wherein the electrically controllable 3/2-way valve comprises
    a) an input connected with the first control pressure line,
    b) an output connected with a control input of the reversing valve arrangement,
    c) an electric control connection connected with the control unit, and
    d) in the through-connection condition, the input of the electrically controllable 3/2-way valve is connected with its output and, in the blocking condition, the input is blocked and the output is connected with the atmosphere.

6. A vehicle braking system according to claim 1, wherein the first brake circuit is a rear-axle brake circuit and the first control valve device contains a dual-channel pressure control module, one channel respectively controlling the brake pressure for the at least one brake cylinder of the rear axle.

7. A vehicle braking system according to claim 6, wherein, the second brake circuit is a front-axle brake circuit and the second control valve device contains a single-channel pressure control module and which controls a joint brake pressure for the first and second brake cylinders of the front axle preferably according to the "select low method".

8. A vehicle braking system according to claim 6, wherein the second brake circuit is a front-axle brake circuit and the second control valve device contains two single-channel pressure control modules, each pressure control module controlling the brake pressure in the respective first or second brake cylinder of the front axle.

9. A vehicle braking system according to claim 1, wherein, the second brake circuit is a front-axle brake circuit and the second control valve device contains a single-channel pressure control module and which controls a joint brake pressure for the first and second brake cylinders of the front axle preferably according to the "select low method."

10. A vehicle braking system according to claim 1, wherein the second brake circuit is a front-axle brake circuit and the second control valve device contains two single-channel pressure control modules, each pressure control module controlling the brake pressure in the respective first or second brake cylinder of the front axle.

* * * * *